US012160062B2

(12) United States Patent
Wi et al.

(10) Patent No.: US 12,160,062 B2
(45) Date of Patent: Dec. 3, 2024

(54) TERMINAL AND ELECTRIC CABLE INCLUDING TERMINAL

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); TOYOTA JIDOSHA KABUSHIKI KAISHA, Toyota (JP)

(72) Inventors: Nungna Wi, Yokkaichi (JP); Masaaki Tabata, Yokkaichi (JP); Hajime Matsui, Yokkaichi (JP); Hiroshi Kobayashi, Okazaki (JP); Takeshi Amakawa, Toyota (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 17/627,098

(22) PCT Filed: Jun. 29, 2020

(86) PCT No.: PCT/JP2020/025477
§ 371 (c)(1),
(2) Date: Jan. 13, 2022

(87) PCT Pub. No.: WO2021/010147
PCT Pub. Date: Jan. 21, 2021

(65) Prior Publication Data

US 2022/0376419 A1 Nov. 24, 2022

(30) Foreign Application Priority Data

Jul. 18, 2019 (JP) ................................ 2019-132786

(51) Int. Cl.
*H01R 11/22* (2006.01)
*H01R 13/11* (2006.01)
*H01R 13/187* (2006.01)

(52) U.S. Cl.
CPC ......... *H01R 13/111* (2013.01); *H01R 13/187* (2013.01)

(58) Field of Classification Search
CPC ............................ H01R 13/187; H01R 13/111
See application file for complete search history.

(56) References Cited

U.S. PATENT DOCUMENTS 4,413,872 A 11/1983 Rudy, Jr. et al.
5,540,603 A * 7/1996 Fujiwara ................ H01R 13/11 439/850

(Continued)

FOREIGN PATENT DOCUMENTS

JP 2003-157924 A 5/2003
JP 2003-331966 A 11/2003

(Continued)

*Primary Examiner* — Neil Abrams
(74) *Attorney, Agent, or Firm* — Oliff PLC

(57) ABSTRACT

A terminal that is to be coupled to a mate terminal. The terminal includes a tubular portion and a spring tab. The mate terminal is to be inserted in the tubular portion and the spring tab is within the tubular portion, and includes a spring-side wall, connection wall, a first side wall that is continuous from the connection wall and the spring-side wall, a second side wall that is continuous from the spring-side wall, and an opening limiter portion. The spring tab presses the mate terminal, which is inserted in the tubular portion, from the spring-side wall toward the connection wall. The tubular portion includes a connection portion that (Continued)

connects the spring tab and connection wall. The tubular portion includes the opening limiter portion that contacts the connection portion from an opposite direction from a pressing direction, in which the spring tab presses the mate terminal, toward the connection wall.

8 Claims, 9 Drawing Sheets

(56) References Cited

U.S. PATENT DOCUMENTS

| | | | | |
|---|---|---|---|---|
| 6,520,811 | B2 * | 2/2003 | Mitani | H01R 13/113 439/852 |
| 6,729,895 | B1 | 5/2004 | Bryan | |
| 7,347,747 | B2 * | 3/2008 | Shimizu | H01R 13/11 439/852 |
| 7,458,864 | B2 * | 12/2008 | Philipp | H01R 13/113 439/851 |
| 8,662,935 | B2 * | 3/2014 | Jouas | H01R 13/193 439/660 |
| 8,944,861 | B2 * | 2/2015 | Amano | H01R 13/113 439/852 |
| 11,888,250 | B2 * | 1/2024 | Jo | H01R 4/5075 |
| 2003/0096533 | A1 | 5/2003 | Kojima et al. | |
| 2006/0035538 | A1 | 2/2006 | Suemitsu et al. | |
| 2006/0068650 | A1 | 3/2006 | Shimizu | |
| 2007/0149068 | A1 | 6/2007 | Shimizu | |
| 2010/0029142 | A1 | 2/2010 | Hiramitsu et al. | |
| 2013/0288545 | A1 | 10/2013 | Amano et al. | |
| 2015/0171546 | A1 | 6/2015 | Kibushi | |
| 2020/0266556 | A1 * | 8/2020 | Takeuchi | H01R 13/10 |

FOREIGN PATENT DOCUMENTS

| | | | |
|---|---|---|---|
| JP | 2006-054166 | A | 2/2006 |
| JP | 2006-100232 | A | 4/2006 |
| JP | 2007-173182 | A | 7/2007 |
| JP | 2013-239420 | A | 11/2013 |
| JP | 2013-251072 | A | 12/2013 |
| JP | 2014-222650 | A | 11/2014 |
| WO | 2008/120632 | A1 | 10/2008 |
| WO | 2014/034419 | A1 | 3/2014 |
| WO | 2019/082753 | A1 | 5/2019 |

* cited by examiner

TERMINAL AND ELECTRIC CABLE INCLUDING TERMINAL

TECHNICAL FIELD

The present disclosure relates to a terminal and an electric cable including a terminal.

BACKGROUND ART

A known female terminal that is to be coupled to a male terminal is described in Japanese Unexamined Patent Application Publication No. 2003-331966. The female terminal includes a rectangular tubular portion in which the male terminal is to be inserted. An elastic contact tab is disposed in the rectangular tubular portion. The male terminal that is inserted in the rectangular tubular portion is pressed toward an inner wall of the rectangular tubular portion by the elastic contact tab such that the male terminal and the female terminal are electrically connected.

RELATED ART DOCUMENT

Patent Document

[Patent Document 1]

Japanese Unexamined Patent Application Publication No. 2003-331966

SUMMARY OF THE INVENTION

Problem to be Solved by the Invention

Recently, the female terminal used for a vehicle has been demanded to be miniaturized. For example, the walls of the rectangular tubular portion may be formed from one metal plate to miniaturize the female terminal.

However, according to the above configuration, the rectangular tubular portion may be deformed to open by the resilient force of the elastic contact tab when the male terminal is pressed toward the inner wall of the rectangular tubular portion by the elastic contact tab.

To suppress the opening deformation of the rectangular tubular portion, the walls of the rectangular tubular portion may be formed by overlapping metal plate portions. The strength of the rectangular tubular portion is increased by overlapping the metal plate portions and the opening deformation may be suppressed.

However, in the above configuration, the female terminal is increased in size by overlapping the metal plate portions and such a configuration is not preferable.

The technology described herein was made in view of the above circumstances. An object is to provide a technology related to a miniaturized terminal.

Means for Solving the Problem

The present disclosure is related to a terminal to be coupled to a mate terminal. The terminal includes a tubular portion and a spring tab. The mate terminal is to be inserted in the tubular portion and the spring tab is within the tubular portion. The tubular portion includes a spring-side wall, a connection wall, a first side wall that is continuous from the connection wall and the spring-side wall, and a second side wall that is continuous from the spring-side wall. The spring tab presses the mate terminal, which is inserted in the tubular portion, from the spring-side wall toward the connection wall. The tubular portion includes a connection portion that connects the spring tab and the connection wall. The tubular portion includes an opening limiter portion that contacts the connection portion from an opposite direction from a pressing direction in which the spring tab presses the mate terminal toward the connection wall.

Advantageous Effects of Invention

According to the present disclosure, the terminal can be miniaturized.

MODES FOR CARRYING OUT THE INVENTION

Figure 1:
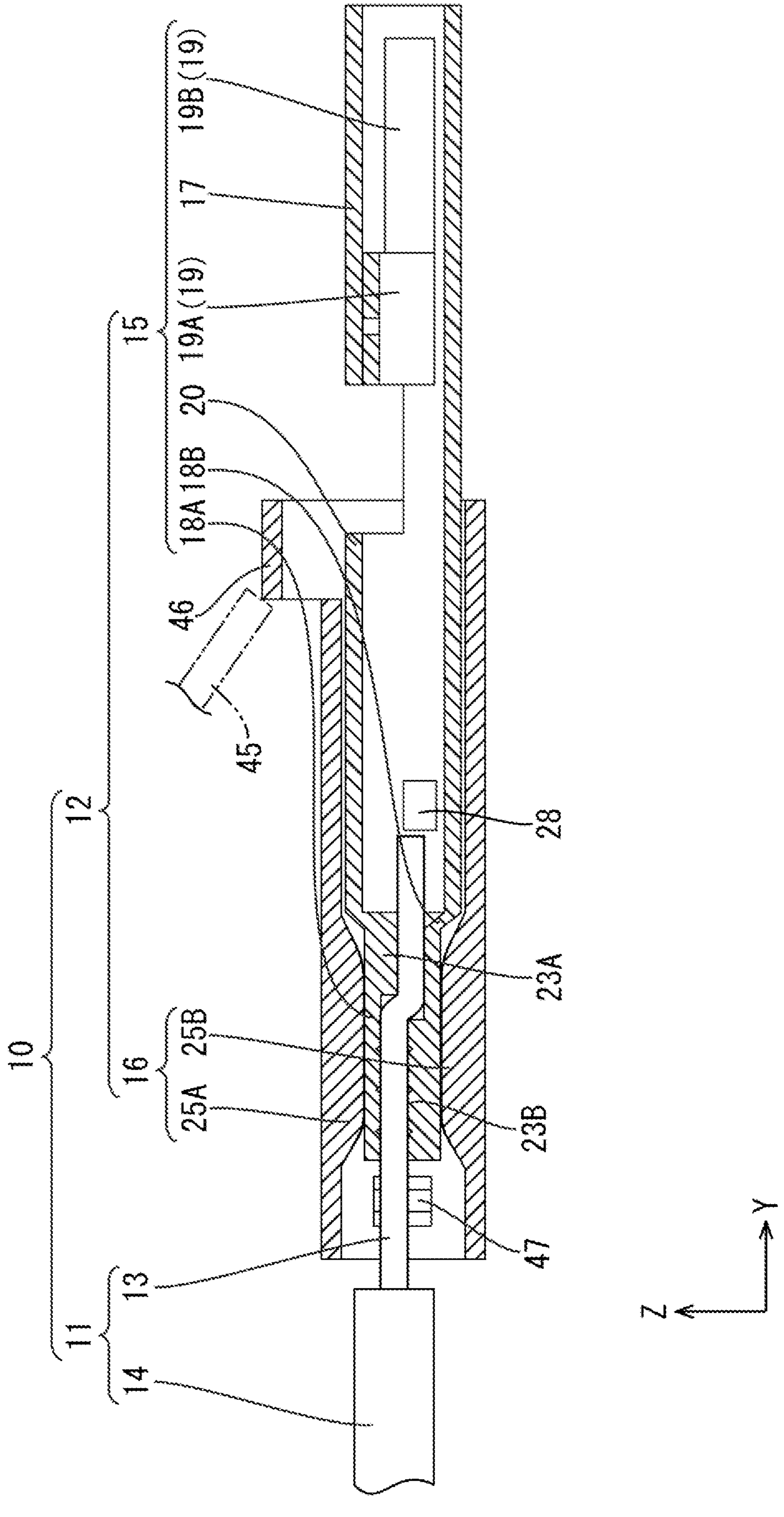
FIG. 1 is a cross-sectional view illustrating an electric cable including a terminal according to a first embodiment.

Description of Embodiments According to the Present Disclosure

First, embodiments according to the present disclosure will be listed and described.

(1) The present disclosure is related to a terminal to be coupled to a mate terminal. The terminal includes a tubular portion and a spring tab. The mate terminal is to be inserted in the tubular portion and the spring tab is within the tubular portion. The tubular portion includes a spring-side wall, a connection wall, a first side wall that is continuous from the connection wall and the spring-side wall, and a second side wall that is continuous from the spring-side wall. The spring tab presses the mate terminal, which is inserted in the tubular portion, from the spring-side wall toward the connection wall. The tubular portion includes a connection portion that connects the spring tab and the connection wall. The tubular portion includes an opening limiter portion that contacts the connection portion from an opposite direction from a pressing direction in which the spring tab presses the mate terminal toward the connection wall.

With the opening limiter portion contacting the connection portion that is continuous from the connection wall, the connection wall is less likely to open.

(2) The connection wall may include a receiving recess and the opening limiter portion may be within the receiving recess.

The opening limiter portion is disposed in the receiving recess of the connection wall. With such a configuration, the opening limiter portion protrudes from an outer surface of the connection wall with a small protrusion dimension. This can miniaturize the terminal as a whole.

(3) An outer surface of the opening limiter portion may be flush with an outer surface of the connection wall.

The connection wall is less likely to open while suppressing the terminal from increasing in size.

(4) The connection portion may be continuous from an edge of the connection wall, the edge of the connection wall being close to the second side wall and the opening limiter portion may be continuous from the second side wall.

Since the connection portion is close to the second side wall and the second side wall includes the opening limiter portion, the connection portion and the opening limiter portion are close to each other. This allows the opening limiter portion to contact the connection portion easily.

(5) A wire coupling portion may be continuous from the tubular portion and may be coupled to an electric wire. The wire coupling portion may include a holding portion that holds the electric wire. A shell may be arranged outside the holding portion. The shell may include a pressing portion that presses the holding portion toward the electric wire.

With the pressing portion pressing the holding portion toward the electric wire, the terminal is connected to the electric wire. With such a configuration, a large jig such as an anvil and a crimper is not necessary to crimp a barrel portion on the electric wire and this can reduce a cost for coupling the terminal to the electric wire.

(6) The shell may be slidable relative to the holding portion in a direction in which the electric wire extends.

The terminal is coupled to the electric wire by sliding the shell relative to the holding portion, that is, with a simple method. This improves work efficiency in coupling of the terminal to the electric wire.

(7) The present disclosure is related to an electric cable including a terminal. The electric cable including a terminal includes the terminal according to any one of (1) to (6) and an electric wire coupled to the terminal.

Detail of Embodiment According to the Present Disclosure

Embodiments according to the present disclosure will be described. The present invention is not limited to the embodiments. All modifications within and equivalent to the technical scope of the claimed invention may be included in the technical scope of the present invention.

First Embodiment

Figure 2:
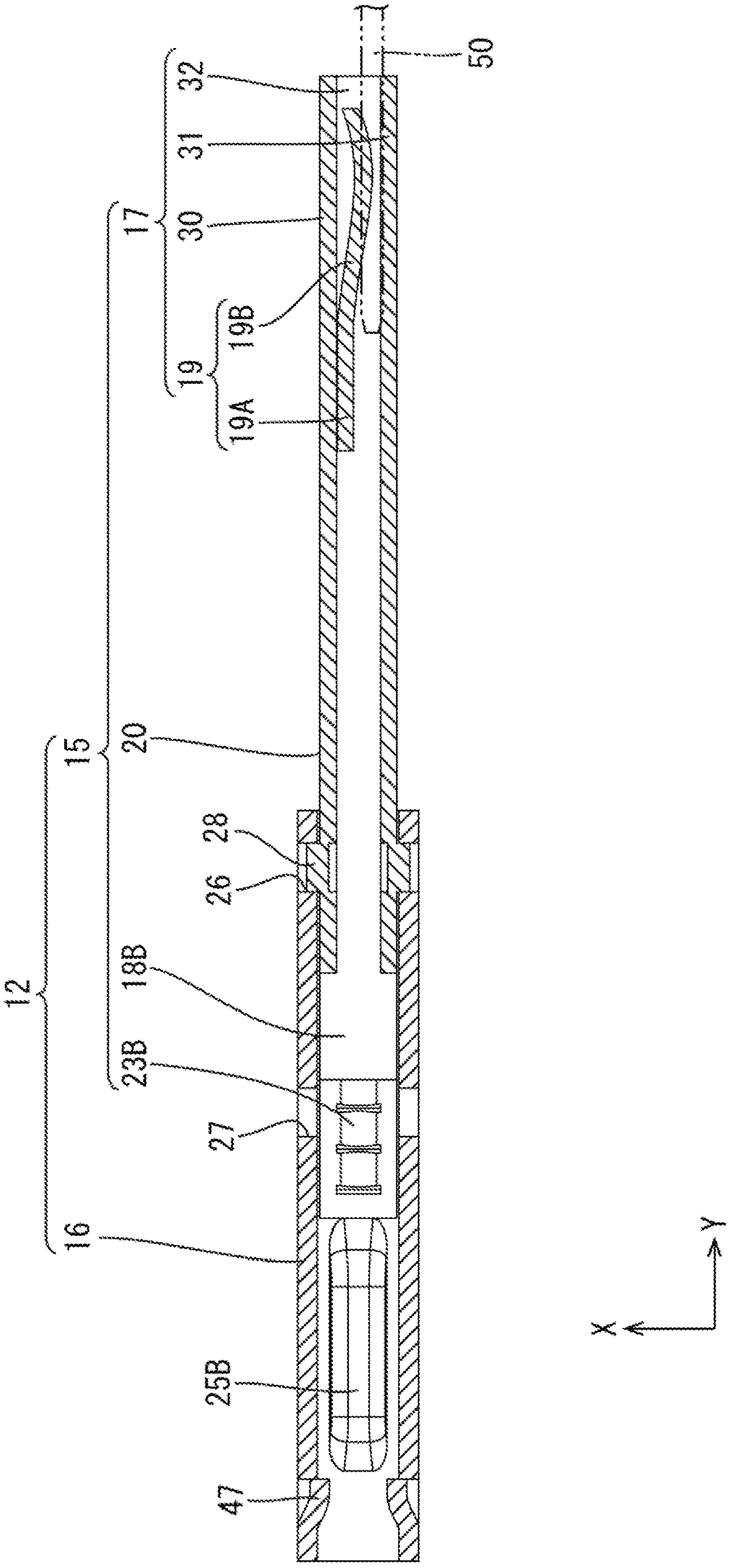
FIG. 2 is a cross-sectional view along line II-II in FIG. 6.

A first embodiment according to the present disclosure will be described with reference to FIGS. 1 to 9. As illustrated in FIG. 1, an electric cable 10 including a terminal according to this embodiment includes a terminal 12 and an electric wire 11 to which the terminal 12 is coupled. The terminal 12 is coupled to a front end portion of the electric wire 11 in an extending direction (a direction indicated by a Y arrow) in which the electric wire 11 extends. As illustrated in FIG. 2, the terminal 12 is coupled to a mate terminal 50. In the following description, it is considered that an Z arrow, the Y arrow, and an X arrow in the drawing point the upper side, the front side, and the left side, respectively. Regarding components having the same configuration, some of the components may be indicated by reference signs and others may not be indicated by the reference signs.

[Electric Wire 11]

As illustrated in FIG. 1, the electric wire 11 extends in a front-rear direction (one example of an extending direction). The electric wire 11 includes a core wire 13 and an insulating sheath 14 that covers an outer surface of the core wire 13. The insulating sheath 14 is made of synthetic resin having insulating properties. The core wire 13 in this embodiment is a single core wire including only one metal wire. Alternatively, a twisted wire including multiple metal fine wires that are twisted together may be used for the core wire 13. The metal of which the metal wire is made may be selected from any kinds of meatal including copper, copper alloy, aluminum, and aluminum alloy where appropriate. The core wire 13 in this embodiment may be made of copper or copper alloy.

[Terminal 12]

Figure 3:
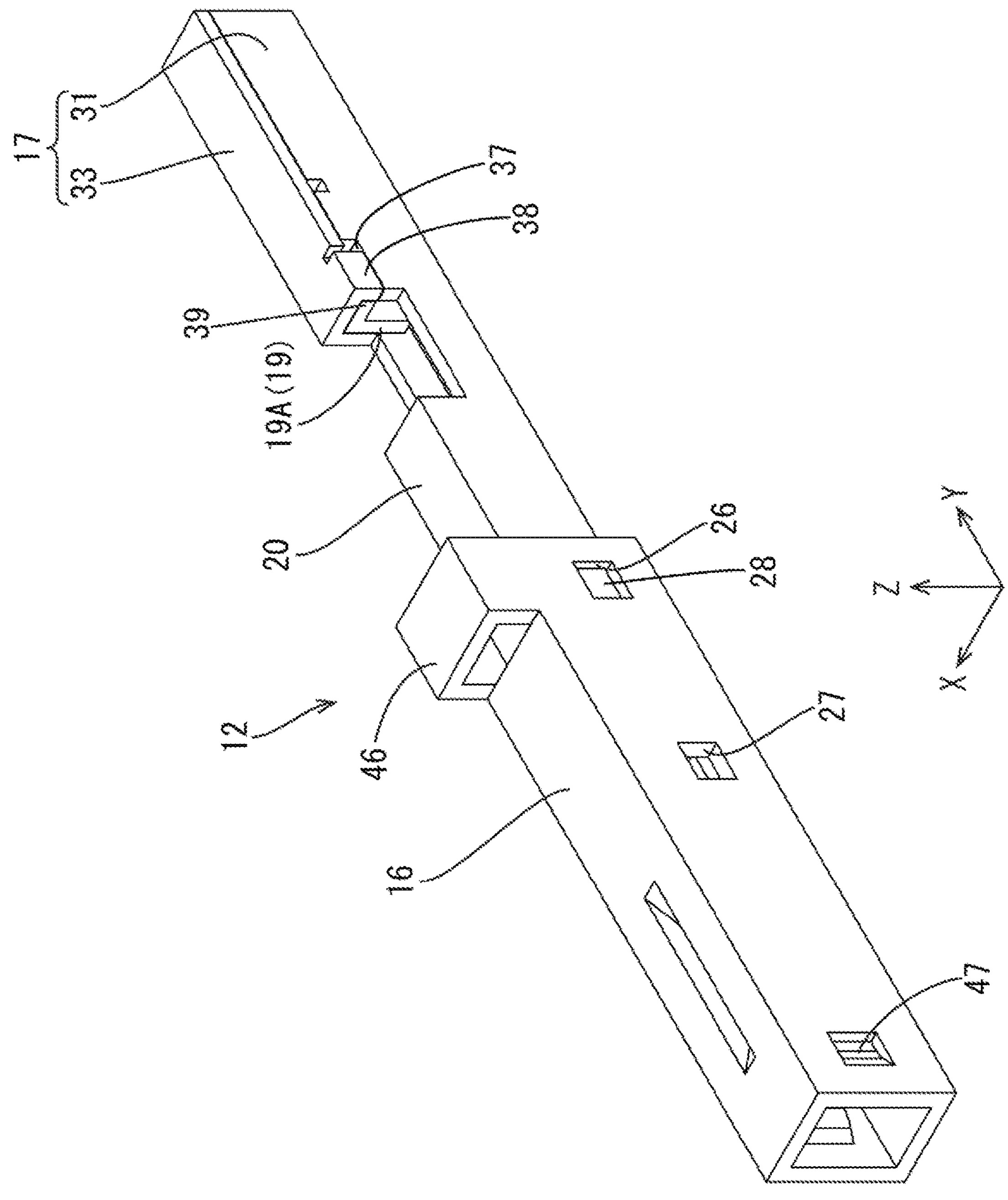
FIG. 3 is a perspective view of the terminal.

As illustrated in FIG. 3, the terminal 12 includes a terminal body 15 and a slider 16 (an example of a shell). The terminal body 15 is made of metal. The slider 16 is slidable relative to the terminal body 15.

[Terminal Body 15]

The terminal body 15 is formed into a predetermined shape by pressing a metal plate. The metal of which the terminal body 15 is made may be selected from any kinds of metal including copper, copper alloy, aluminum, aluminum alloy, and stainless steel where appropriate. The terminal body 15 in this embodiment may be made of copper or copper alloy. Surfaces of the terminal body 15 may be plated. The plating metal may be selected from any kinds of metal such as tin, nickel, and silver where appropriate. The terminal body 15 in this embodiment is tin-plated.

Figure 4:
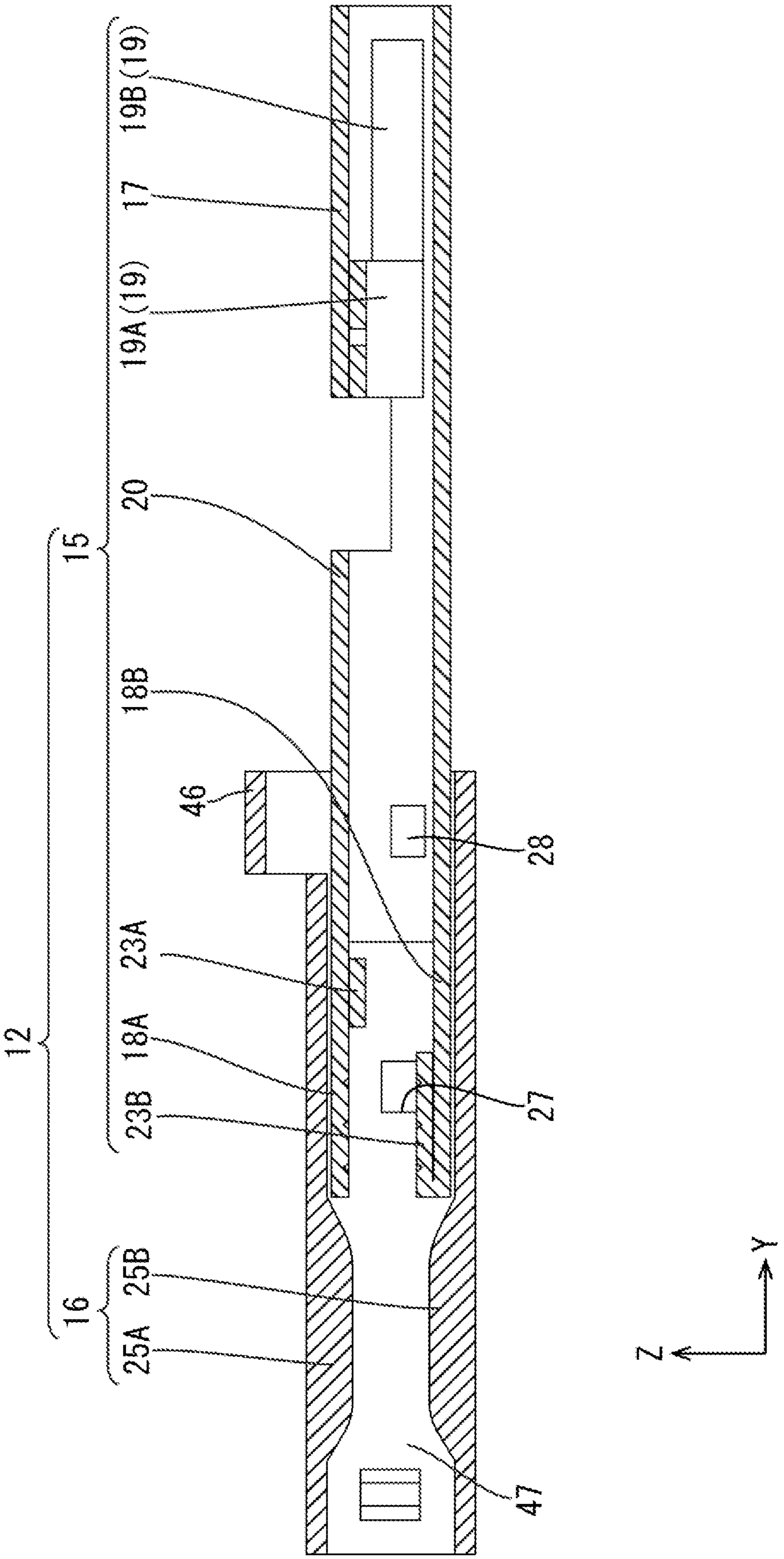
FIG. 4 is a cross-sectional view along line IV-IV in FIG. 7.

As illustrated in FIG. 4, the terminal body 15 includes a tubular portion 17 and a wire coupling portion 20. The mate terminal 50 that is a plate member extending in the front-rear direction is inserted into the tubular portion 17. The wire coupling portion 20 is behind the tubular portion 17 and coupled to the electric wire 11. The wire coupling portion 20 includes an upper holding section 18A and a lower holding section 18B that extend rearward. The terminal 12 in this embodiment is a so-called female terminal and the mate terminal 50 is a so-called male terminal (refer to FIG. 2).

[Tubular Portion 17]

As illustrated in FIG. 2, the tubular portion 17 has a rectangular tubular shape and extends in the front-rear direction. The tubular portion 17 has an opening in a front end thereof and the mate terminal 50 is inserted through the opening. The tubular portion 17 includes a spring-side wall 30, a connection wall 31 that is opposite the spring-side wall 30, a first side wall 32 that connects the spring-side wall 30 and the connection wall 31, and a second side wall 33 that is continuous from the spring-side wall 30. The tubular portion 17 includes a spring tab 19 therein. The spring tab 19 is elastically deformable. The spring tab 19 is contacted with an inner surface of the spring-side wall 30.

The spring tab 19 includes a basal portion 19A and a spring body portion 19B that extends frontward from the basal portion 19A. The basal portion 19A is contacted with the rear end portion of the spring-side wall 30. A height of the basal portion 19A in an upper-lower direction is substantially same as a height of the spring-side wall 30 in the upper-lower direction. The spring body portion 19B extends frontward from a rear end portion of the tubular portion 17.

As illustrated in FIG. 2, the spring body portion 19B has a mountain shape that projects rightward seen from above. A distance between a top of the mountain shape of the spring body portion 19B and the inner surface of the connection wall 31 with respect to the right-left direction is smaller than a thickness of the mate terminal 50 with respect to the right-left direction. According to such a configuration, the mate terminal 50 that is inserted in the tubular portion 17 presses and elastically deforms the spring tab 19. The spring tab 19 that is elastically deformed presses the mate terminal 50 toward the connection wall 31 by the resilient force. In this embodiment, the spring tab 19 presses the mate terminal

50 rightward (one example of a pressing direction). When the mate terminal 50 is held between the connection wall 31 and the spring tab 19, the terminal 12 is electrically connected to the mate terminal 50.

Figure 5:
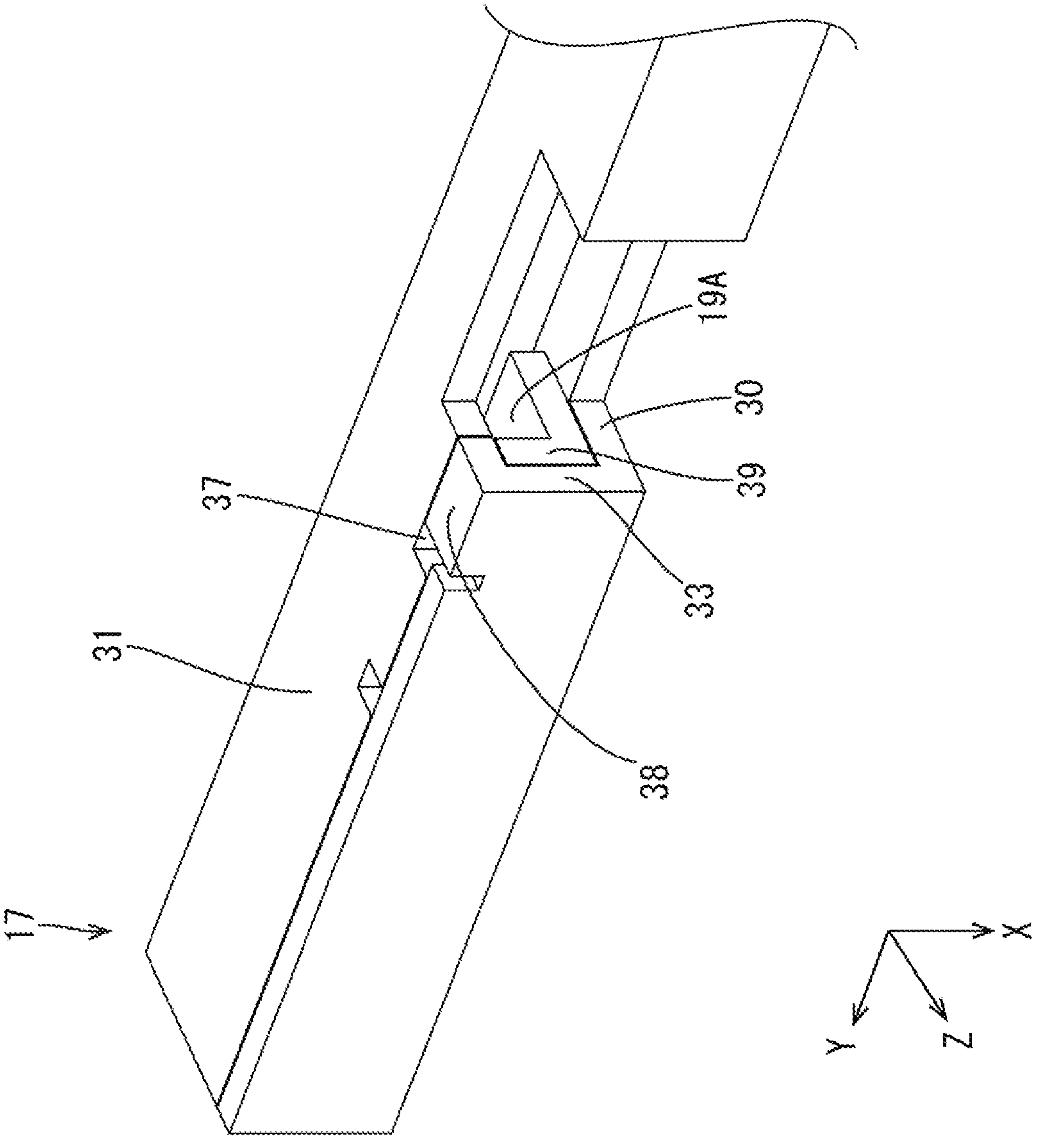
FIG. 5 is an enlarged view illustrating a portion of a tubular portion.

As illustrated in FIG. 5, a lower edge of the spring-side wall 30 and a lower edge of the connection wall 31 are connected via the first side wall 32. An upper edge of the spring-side wall 30 is continuous to the second side wall 33. The second side wall 33 extends rightward from the upper edge of the spring-side wall 30. The first side wall 32 and the second side wall 33 are opposite each other.

[Wire Coupling Portion 20]

As illustrated in FIG. 4, the wire coupling portion 20 is behind the tubular portion 17. The wire coupling portion 20 has a rectangular tubular shape. The wire coupling portion includes the upper holding section 18A (an example of a holding section) and the lower holding section 18B (an example of the holding section). The upper holding section 18A projects rearward from a rear end portion of an upper wall of the wire coupling portion 20. The lower holding section 18B projects rearward from a rear end portion of a lower wall of the wire coupling portion 20. The upper holding section 18A and the lower holding section 18B have elongated shapes extending in the front-rear direction. Lengths of the upper holding section 18A and the lower holding section 18B measuring in the front-rear direction are about equal to each other.

An upper holding protrusion 23A protrudes downward from a section of a lower surface of the upper holding section 18A in front of a rear edge of the upper holding section 18A. A lower holding protrusion 23B protrudes upward from a section of an upper surface of a rear edge of the lower holding section 18B. The lower holding protrusion 23B is displaced from the upper holding protrusion 23A in the front-rear direction.

A lower surface of the upper holding section 18A and an upper surface of the lower holding section 18B dig into an oxide layer formed on the surface of the core wire 13 and locally strip the oxide layer so that the metal surface of the core wire 13 is exposed. With the metal surface contacting the upper holding section 18A and the lower holding section 18B, the core wire 13 is electrically connected to the terminal body 15.

[Slider 16]

As illustrated in FIG. 3, the slider 16 has a rectangular tube shape that extends in the front-rear direction. The slider 16 is produced by a known method including cutting, casting, and pressing where appropriate. The metal of which the slider 16 is made may be selected from any kinds of metal including copper, copper alloy, aluminum, aluminum alloy, and stainless steel where appropriate. The slider 16 in this embodiment is made of stainless steel; however, the metal is not limited thereto. Surfaces of the slider 16 may be plated. Metal used for plating may be selected from any kinds of metal including tin, nickel, and silver where appropriate.

Figure 6:
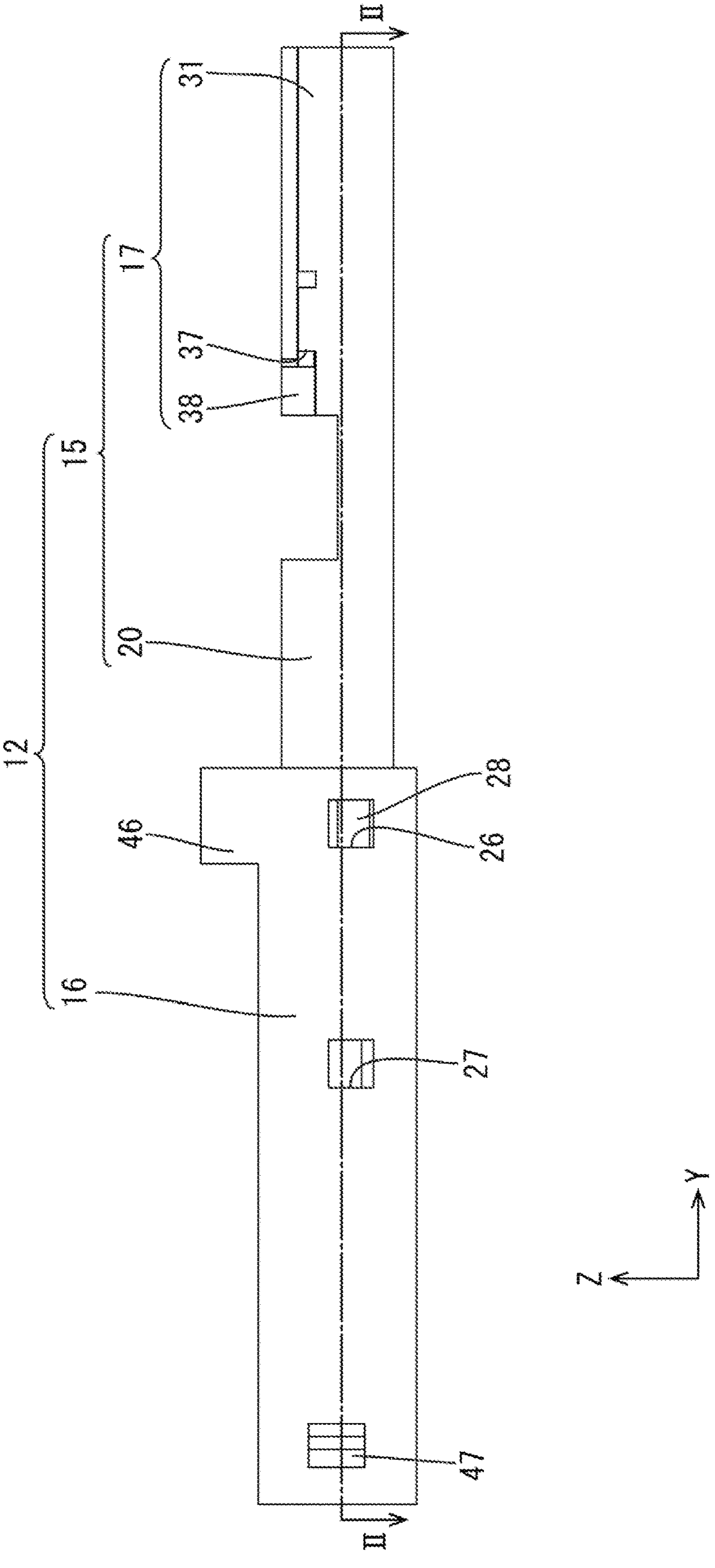
FIG. 6 is a side view illustrating the terminal.
Figure 7:
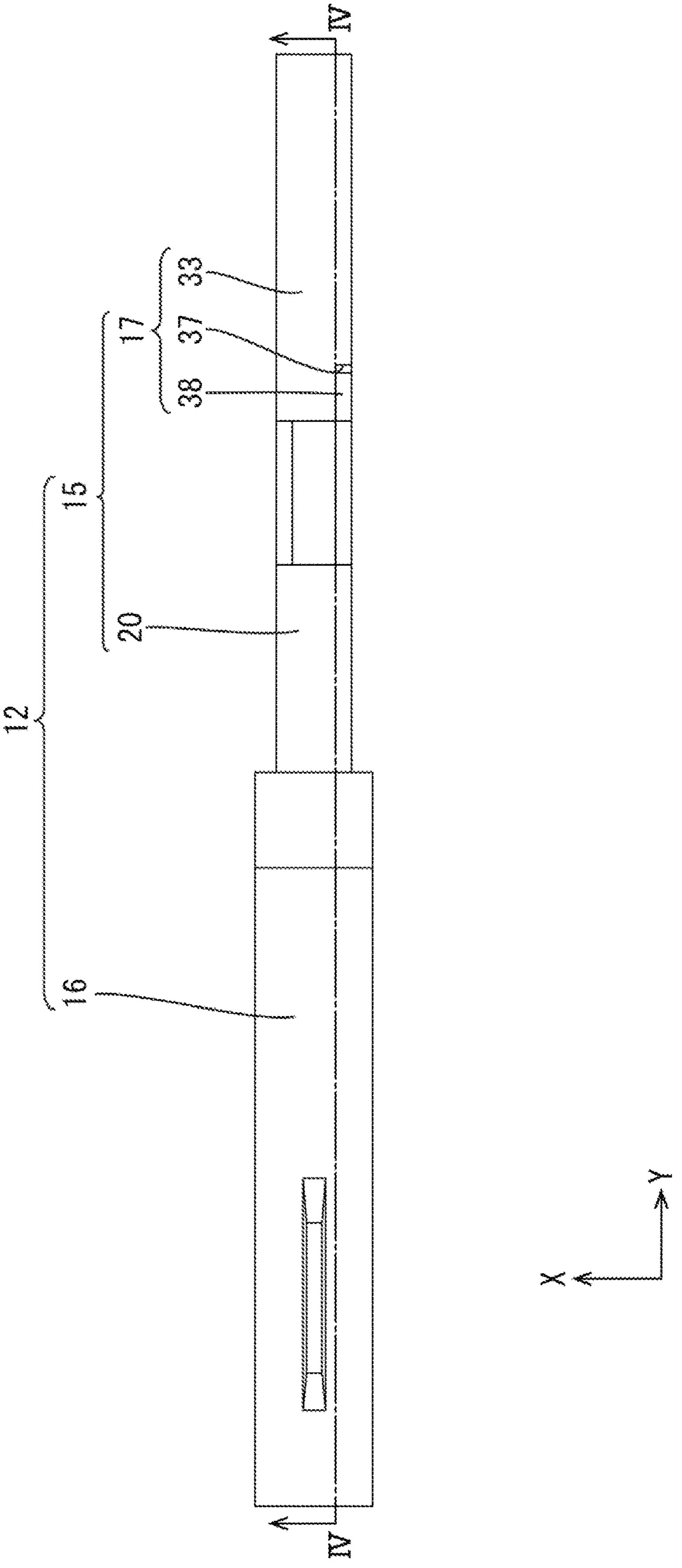
FIG. 7 is a plan view illustrating the terminal.

As illustrated in FIG. 4, a cross-sectional dimension of an inner shape of the slider 16 is about same as or greater than a cross-sectional dimension of an outer shape of a section of the terminal body 15 including the upper holding portion 18A and the lower holding portion 18B. According to such a configuration, as illustrated in FIGS. 6 and 7, the slider 16 is outside the section of the terminal body 15 including the upper holding portion 18A and the lower holding portion 18B.

As illustrated in FIG. 3, side walls of the slider include temporary receiving holes 26 at positions closer to the front edge of the slider 16 in the front-rear direction. The side walls of the slider 16 include permanent receiving holes 27 behind the temporary receiving holes 26. Holding protrusions 28 on the sidewalls of the terminal body 15 can be elastically held in the temporary receiving holes 26 or the permanent receiving holes 27.

As illustrated in FIG. 3, when the holding protrusions 28 of the terminal body 15 are held in the temporary receiving holes 26 of the slider 16, the slider 16 is held at a temporary holding position relative to the terminal body 15. As illustrated in FIG. 4, at this position, the upper pressing portion 25A and the lower pressing portion 25B of the slider 16 are separated rearward from the rear edges of the upper holding section 18A and the lower holding section 18B of the terminal body 15. Further, a gap between the upper holding section 18A and the lower holding section 18B is greater than the diameter of the core wire 13.

When the holding protrusions 28 of the terminal body 15 are held in the permanent receiving holes 27 of the slider 16, the slider 16 is held at the permanent holding position relative to the terminal body 15. As illustrated in FIG. 1, at this position, the upper pressing portion 25A of the slider 16 contacts the upper holding section 18A from above. Further, the lower pressing portion 25B of the slider 16 contacts the lower holding section 18B from below.

As described above, while the slider 16 is fitted on the section of the terminal body 15 including the upper holding section 18A and the lower holding section 18B, the slider 16 is slidable in the front-rear direction between the temporary holding position and the permanent holding position.

As illustrated in FIG. 1, when the slider 16 is held at the permanent holding position relative to the terminal body 15, the upper pressing portion 25A presses the upper holding section 18A from above and thus the upper holding section 18A deforms downward. Further, the lower pressing portion 25B presses the lower holding section 18B from below and thus the lower holding section 18B deforms upward. When the core wire 13 is disposed in a gap between the upper holding section 18A and the lower holding section 18B to extend in the front-rear direction and the slider 16 is held at the permanent holding position relative to the terminal body 15, the core wire 13 is sandwiched between the upper holding section 18A and the lower holding section 18B that are deformed in the upper-lower direction. Namely, the upper holding section 18A that is pressed downward by the upper pressing portion 25A contacts the core wire 13 from above and the lower holding section 18B that is pressed upward by the lower pressing portion 25B contacts the core wire 13 from below. The upper pressing portion 25A presses the upper holding section 18A downward from above and a direction forwarding from an upper side to a lower side is defined as a pressing direction of the upper pressing portion 25A. The lower pressing portion 25B presses the lower holding section 18B upward from below and a direction forwarding from the lower side to the upper side is defined as a pressing direction of the lower pressing portion 25B.

As illustrated in FIG. 1, when the slider 16 is held at the permanent holding position relative to the terminal body 15, the upper holding protrusion 23A of the upper holding section 18A presses the core wire 13 from above and the lower holding protrusion 23B of the lower holding section 18B presses the core wire 13 from below. The core wire 13 is pressed by the upper holding protrusion 23A and the lower holding protrusion 23B. Therefore, the core wire 13 remains bent in the upper-lower direction. With the upper holding protrusion 23A and the lower holding protrusion 23B, the core wire 13 is electrically connected to the terminal 12.

As illustrated in FIG. 1, the slider 16 includes a jig contact section 46 in a front end portion thereof and the jig contact section 46 protrudes upward from an upper wall of the slider 16. When a jig 45 contacts the jig contact section 46 from the rear, the slider 16 is pushed forward by the jig 45. That is, the slider 16 moves forward. The jig 45 is smaller than a die or equipment to move the die. Therefore, an increase in cost related to the jig 45 is less likely to occur.

As illustrated in FIG. 3, the slider 16 includes drawing sections 47 at a position closer to the rear edge of the slider 16. The drawing sections 47 protrude from the right wall and the left wall to an inner side of the slider 16. The drawing sections 47 have a width that decreases from the rear side to the front side. With the core wire 13 sliding on inner surfaces of the drawing sections 47, the core wire 13 is guided into the slider 16.

[Opening Limiter Portion 38]

Figure 8:
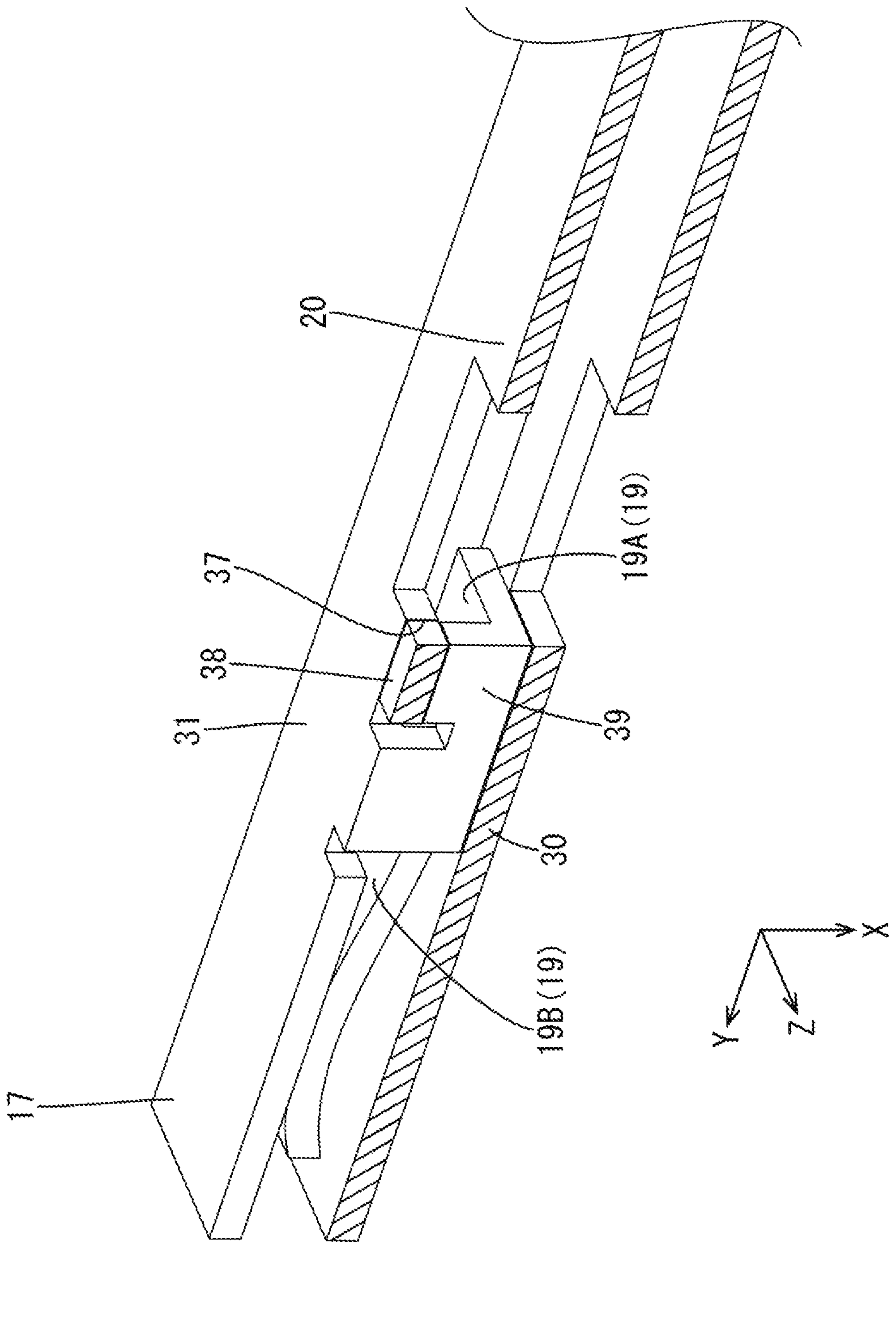
FIG. 8 is an enlarged cross-sectional view illustrating an opening limiter portion and a connection portion.

As illustrated in FIG. 8, a receiving recess 37 is in the upper edge of the rear end section of the connection wall 31. The receiving recess 37 has a rectangular shape in a right view. The receiving recess 37 is formed by cutting a portion away from the connection wall 31.

The opening limiter portion 38 is on the right edge of the rear portion of the second side wall 33. The opening limiter portion 38 is bent downward and fitted in the receiving recess 37. The opening limiter portion 38 is bent in a direction along a wall surface of the connection wall 31 (downward) from the connection wall 31-side edge of the second side wall 33. Namely, the opening limiter portion 38 is continuous from the second side wall 33. An inner shape of the receiving recess 37 is same as or slightly greater than an outer shape of the opening limiter portion 38. A right surface of the connection wall 31 is flush with a right surface of the opening limiter portion 38.

Figure 9:
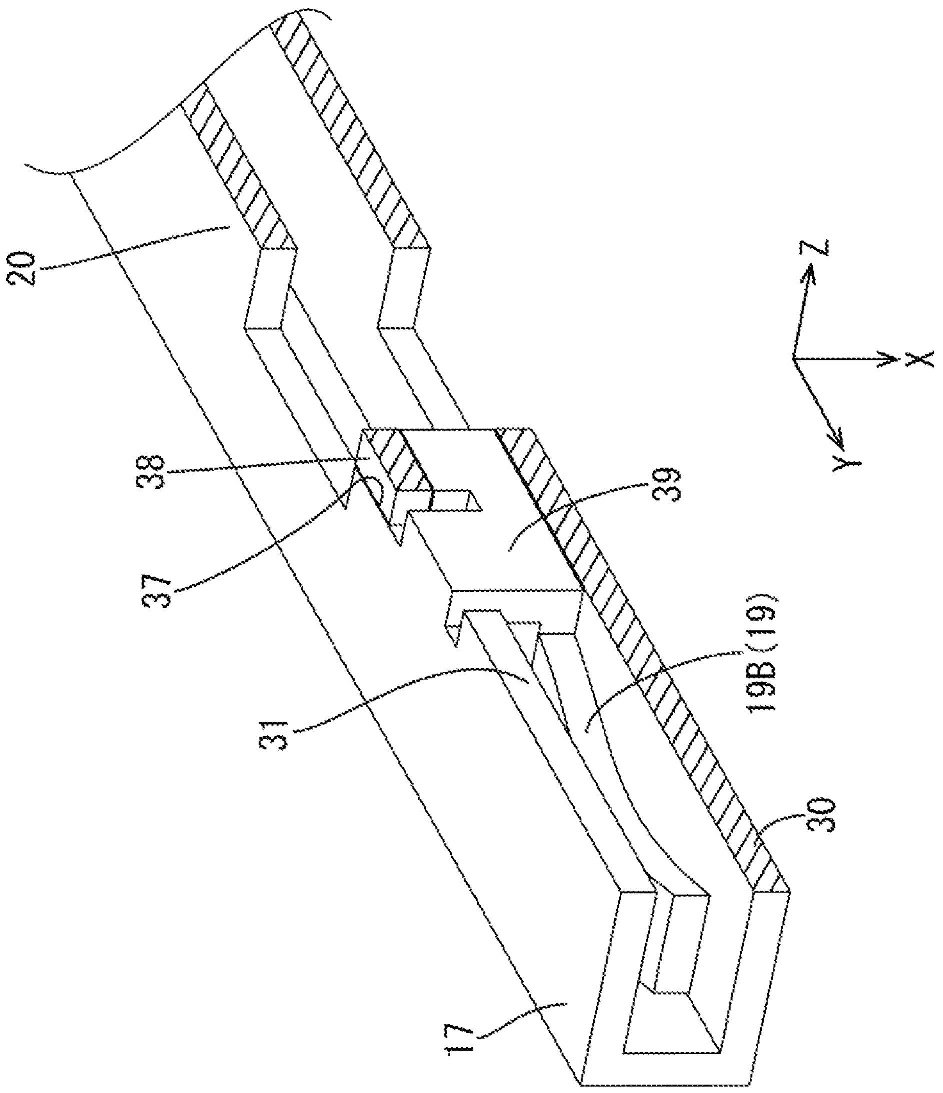
FIG. 9 is an enlarged cross-sectional view illustrating the opening limiter portion and the connection portion.

As illustrated in FIGS. 8 and 9, a connection portion 39 is in front of the receiving recess 37 on the upper edge of the connection wall 31. The connection portion extends leftward from the upper edge of the connection wall 31. The connection portion 39 extends along a lower surface of the second side wall 33. The basal portion 19A of the spring tab 19 is continuous from the left end of the connection portion 39. Thus, the connection wall 31 and the spring tab 19 are connected via the connection portion 39.

As illustrated in FIGS. 8 and 9, the connection portion 39 extends leftward from the upper edge of the connection wall 31 and is bent and extends rearward and is further bent and extends downward. Thus, the connection portion 39 is continuous to the basal portion 19A of the spring tab 19. The connection portion 39 is continuous from the edge of the connection wall 31 close to the second side wall 33. The connection portion 39 has about a crank shape in an upper view.

As illustrated in FIG. 8, the rear end portion of the right edge of the connection portion 39 is opposite the opening limiter portion 38. The opening limiter portion 38 has a downward protrusion dimension that is equal to or slightly greater than a thickness of the connection portion in the upper-lower direction. Accordingly, the opening limiter portion 38 and the connection portion 39 have a large contact area. When a force is applied to the connection wall 31 to open rightward, the opening limiter portion 38 contacts the rear end portion of the right edge of the connection portion 39 from the right side. Thus, opening of the connection wall 31 rightward is restricted.

[Steps of Coupling Electric Wire 11 and Terminal 12]

Next, one example of steps of coupling the electric wire and the terminal 12 will be described. The steps of coupling the electric wire 11 and the terminal 12 are not limited to those described below.

The terminal body 15 and the slider 16 are prepared with a known method. The slider 16 is attached to the terminal body 15 from the rear. The slider 16 is held at the temporary holding position relative to the terminal body 15. Although details are not illustrated, the slider 16 may be held at the temporary holding position relative to the terminal body 15 with a known holding structure.

The section of the core wire 13 of the electric wire 11 is exposed by striping the section of the insulating sheath 14 with a known method.

The electric wire 11 is inserted frontward into the slider 16 from the rear end of the slider 16. The front end portion of the core wire 13 is guided into the slider 16 from the rear end of the slider 16. When the electric wire 11 is pushed further forward, the front end of the core wire 13 enters the inside of the terminal body 15 and reaches the gap between the upper holding section 18A and the lower holding section 18B.

When the slider 16 is held at the temporary holding position relative to the terminal body 15, the gap between the upper holding section 18A and the lower holding section 18B is greater than the outer diameter of the core wire 13.

Next, the slider 16 is slid frontward. The slider 16 is moved frontward relative to the terminal body 15 by the jig 45 and is held at the permanent holding position.

With the slider 16 held at the permanent holding position relative to the terminal body 15, the upper pressing portion 25A of the slider 16 contacts the upper holding section 18A of the terminal body 15 from above and presses the upper holding section 18A downward. The lower pressing portion 25B of the slider 16 contacts the lower holding section 18B of the terminal body 15 from below and presses the lower holding section 18B upward. Therefore, the core wire 13 is sandwiched between the upper holding section 18A and the lower holding section 18B in the upper-lower direction.

As illustrated in FIG. 1, the core wire 13 is sandwiched between the lower surface of the upper holding section 18A and the upper surface of the lower holding section 18B. The oxide film on the surface of the core wire is striped and a metal surface of the core wire 13 is exposed. With the metal surface contacting the upper holding section 18A and the lower holding section 18B, the electric wire 11 is electrically connected to the terminal 12.

When the core wire 13 is sandwiched between the upper holding section 18A and the lower holding section 18B in the upper-lower direction, the core wire 13 is sandwiched between the upper holding protrusion 23A on the upper holding section 18A and the lower holding protrusion 23B on the lower holding section 18B. The core wire 13 is stretched in the front-rear direction and bent in the upper-lower direction. According to the configuration, the core wire 13 is firmly held and thus the electric wire 11 and the terminal 12 are held together with a greater force even when the electric wire 11 is pulled. The electric cable 10 including the terminal is complete.

Operation and Effects of this Embodiment

Next, operations and effects of this embodiment will be described. This embodiment is related to the terminal 12 that is to be coupled to the mate terminal 50. The terminal 12 includes the tubular portion 17 and the spring tab 19. The mate terminal 50 is to be inserted in the tubular portion 17 and the spring tab 19 is within the tubular portion 17. The tubular portion 17 includes the spring-side wall 30, the connection wall 31, the first side wall 32 that is continuous from the connection wall 31 and the spring-side wall 30, and the second side wall that is continuous from the spring-side wall 30. The spring tab 19 presses the mate terminal 50, which is inserted in the tubular portion 17, from the spring-side wall 30 toward the connection wall 31. The tubular portion 17 includes the connection portion 39 that connects the spring tab 19 and the connection wall 31. The tubular portion 17 includes the opening limiter portion 38 that contacts the connection portion 39 from the opposite direction from the pressing direction (the right direction in this embodiment) in which the spring tab 19 presses the mate terminal 50 toward the connection wall 31.

The electric cable 10 including the terminal according to this embodiment includes the terminal 12 and the electric wire 11 coupled to the terminal 12.

With the opening limiter portion 38 contacting the connection portion 39 that is continuous from the connection wall 31, the connection wall 31 is less likely to be deformed to open.

According to this embodiment, the connection wall includes the receiving recess 37 and the opening limiter portion 38 is in the receiving recess 37.

The opening limiter portion 38 is disposed in the receiving recess 37 of the connection wall 31. With such a configuration, the opening limiter portion 38 protrudes from the outer surface of the connection wall 31 with a small protrusion dimension. This can miniaturize the terminal 12 as a whole.

In this embodiment, the outer surface of the opening limiter portion 38 is flush with the outer surface of the connection wall 31. This suppresses the terminal 12 from increasing its size and suppresses the connection wall 31 from being deformed and opening.

In this embodiment, the connection portion 39 is continuous from the second side wall 33-side edge of the connection wall 31 and the opening limiter portion 38 is continuous from the second side wall 33.

Since the connection portion 39 is close to the second side wall 33 and the second side wall 33 includes the opening limiter portion 38, the connection portion 39 and the opening limiter portion 38 are close to each other. This allows the opening limiter portion 38 to contact the connection portion 39 easily.

In this embodiment, the wire coupling portion 20 that is connected to the electric wire 11 is continuous from the tubular portion 17. The wire coupling portion 20 includes the upper holding section 18A and the lower holding section 18B that sandwich the electric wire 11. The slider 16 is outside the upper holding section 18A and the lower holding section 18B. The slider 16 includes the upper pressing portion 25A and the lower pressing portion 25B that press the upper holding section 18A and the lower holding section 18B toward the electric wire 11.

With the upper pressing portion 25A and the lower pressing portion 25B pressing the upper holding section 18A and the lower holding section 18B toward the core wire 13 of the electric wire 11, the terminal 12 is connected to the core wire 13 of the electric wire 11. With such a configuration, a large jig such as an anvil and a crimper is not necessary to crimp a barrel portion on the surface of the electric wire 11 and this can reduce a cost for coupling the terminal 12 to the electric wire 11.

In this embodiment, the slider 16 is slidable in the extending direction (the front-rear direction), in which the electric wire 11 extends, relative to the upper holding section 18A and the lower holding section 18B.

In this embodiment, the terminal 12 is coupled to the electric wire 11 by sliding the slider 16 relative to the upper holding section 18A and the lower holding section 18B, that is, with a simple method. This improves work efficiency in coupling of the terminal 12 to the electric wire 11.

Other Embodiments (1) The receiving recess 37 may be formed by reducing a thickness of a portion of the connection wall 31.

(2) The opening limiter portion 38 may be thinner than other portions of the terminal 12.

(3) The coupling structure of the electric wire 11 and the terminal 12 is not limited but may include other structure as appropriate. For example, the terminal may include a barrel that is to be crimped on the outer surface of the electric wire 11.

(4) The terminal 12 may include only one holding section or three or more holding sections.

EXPLANATION OF SYMBOLS

10: Electric cable including a terminal
11: Electric wire
12: Terminal
13: Core wire
14: Insulating sheath
15: Terminal body
16: Slider (an example of shell)
17: Tubular portion
18A: Upper holding section
18B: Lower holding section
19: Elastic tab
19A: Basal portion
19B: Spring body portion
20: Wire coupling portion
23A: Upper holding protrusion
23B: Lower holding protrusion
25A: Upper pressing portion
25B: Lower pressing portion
26: Temporary receiving hole
27: Permanent receiving hole
28: Holding protrusion
30: Spring-side wall
31: Connection wall
32: First side wall
33: Second side wall
37: Receiving recess
38: Opening limiter portion
39: Connection portion
45: jig
46: Jig contact section
47: Drawing section
50: Mate terminal

The invention claimed is:

1. A terminal to be coupled to a mate terminal, the terminal comprising:

a tubular portion in which the mate terminal is to be inserted;

a wire coupling portion being continuous from the tubular portion and coupled to an electric wire, the wire coupling portion including a holding portion that holds the electric wire; and a shell arranged outside the holding portion and including a pressing portion that presses the holding portion toward the electric wire, wherein the tubular portion comprises:

a spring-side wall, a connection wall, a first side wall that is continuous from the connection wall and the spring-side wall, and a second side wall that is continuous from the spring-side wall;

a spring tab within the tubular portion and pressing the mate terminal, which is inserted in the tubular portion, from the spring-side wall toward the connection wall;

a connection portion that connects the spring tab and the connection wall; and an opening limiter portion that contacts the connection portion from an opposite direction from a pressing direction in which the spring tab presses the mate terminal toward the connection wall, wherein the connection wall includes a receiving recess and the opening limiter portion is within the receiving recess.

2. The terminal according to claim 1, wherein an outer surface of the opening limiter portion is flush with an outer surface of the connection wall.

3. The terminal according to claim 1, wherein the connection portion is continuous from an edge of the connection wall, the edge of the connection wall being close to the second side wall, and the opening limiter portion is continuous from the second side wall.

4. The terminal according to claim 1, wherein the shell is slidable relative to the holding portion in a direction in which the electric wire extends.

5. An electric cable including a terminal comprising:

the terminal according to claim 1; and an electric wire coupled to the terminal.

6. A terminal to be coupled to a mate terminal, the terminal comprising:

a tubular portion in which the mate terminal is to be inserted;

a wire coupling portion being continuous from the tubular portion and coupled to an electric wire, the wire coupling portion including a holding portion that holds the electric wire; and a shell arranged outside the holding portion and including a pressing portion that presses the holding portion toward the electric wire, wherein the tubular portion comprises:

a spring-side wall, a connection wall, a first side wall that is continuous from the connection wall and the spring-side wall, and a second side wall that is continuous from the spring-side wall;

a spring tab within the tubular portion and pressing the mate terminal, which is inserted in the tubular portion, from the spring-side wall toward the connection wall;

a connection portion that connects the spring tab and the connection wall; and an opening limiter portion that contacts the connection portion from an opposite direction from a pressing direction in which the spring tab presses the mate terminal toward the connection wall.

7. The terminal according to claim 6, wherein the shell is slidable relative to the holding portion in a direction in which the electric wire extends.

8. An electric cable including a terminal comprising:

the terminal according to claim 6; and an electric wire coupled to the terminal.

* * * * *